June 30, 1970 J. C. FRENCH 3,518,454

BIDIRECTIONAL TRANSMISSION CIRCUIT

Filed Oct. 20, 1967

INVENTOR
J. C. FRENCH
BY
C. E. Hirsch Jr.
ATTORNEY

United States Patent Office
3,518,454
Patented June 30, 1970

3,518,454

BIDIRECTIONAL TRANSMISSION CIRCUIT

Joseph C. French, Plainfield, N.J., assignor to Bell Telephone Laboratories, Incorporated, Murray Hill and Berkeley Heights, N.J., a corporation of New York Filed Oct. 20, 1967, Ser. No. 676,798
Int. Cl. H03k *17/66*
U.S. Cl. 307—251 10 Claims

ABSTRACT OF THE DISCLOSURE

A single field effect transistor stage is utilized as an impedance translating network and as a transmission gate. Impedance translation of a primary signal source is accomplished by arranging a field effect transistor in a source follower configuration. Signals may be transmitted from a secondary source to the primary source by forward biasing a junction of the source follower field effect transistor.

BACKGROUND OF THE INVENTION

This invention relates to low level amplification systems and, more specifically, to a source follower circuit having bidirectional signal transmission capability.

DESCRIPTION OF THE PRIOR ART

In most low level amplification systems, noise is a problem. Therefore, devices utilized in amplifying low level signals should not contribute appreciable noise to the system. Additionally, since most low level sources tend to have high output impedance, the device must have high input impedance. To meet these requirements, namely, low noise performance and high input impedance, the electrometer tube, and more recently the field effect transistor, have been utilized. Typical applications in which field effect transistors are utilized include those relating to biological investigations. Examples of amplifiers used in biological applications are discussed in an article by R. E. Webb entitled "Field Effect Transistors for Biological Amplifiers," in Electronic Engineering December 1965, at page 803.

One biological application involves measuring the electrical activity of individual nerve cells. Signals from a cell are usually detected by a micro-electrode probe, which is inherently high in impedance. Thereafter, the signals are applied to a field effect transistor stage which is used either as an impedance translator or as an amplifier. During investigation of nerve cell electrical activity, it is often desirable to stimulate the cell and to mark its location. This may be accomplished by the application of an electrical signal to the cell through the micro-electrode probe. Heretofore, stimulation and marking have been accomplished primarily by using individual switching elements, or clip leads, to connect an additional circuit to the micro-electrode probe. These devices introduce noise and additional capacitance into the system; therefore, they are unsatisfactory. Moreover, long periods are required to accomplish stimulation or marking in such systems. Difficulties in recording the cell activity immediately after stimulation are also encountered. Obviously, with such systems, controlled periods of stimulation and recording cannot be achieved.

SUMMARY OF THE INVENTION

Therefore, problems in the prior systems are overcome, according to this invention, by use of a low noise, low level amplification system which has bidirectional signal transmission capabilities. This is accomplished according to the invention by turning to account the high impedance and low noise characteristics of a field effect transistor.

Thus, in one embodiment of the invention, signals from a high impedance, low level source, for example, a micro-electrode probe in contact with a nerve cell, are applied to a combined source follower and electrical stimulator circuit. In one mode of operation, for example, in receiving signals from a primary source, the circuit operates as a normal impedance translator. However, during receiving it becomes necessary at times to transmit signals from a secondary source, for example, to stimulate or mark the location of the primary source. This is accomplished according to this invention by the application of a selected current to a particular primary signal source for a given duration of time by forward biasing a junction of the field effect transistor used in the impedance translation circuit. Accordingly, selective forward biasing of a junction of the field effect transistor may be achieved by separating the field effect transistor from its normal supply of bias potential and applying a potential of proper polarity to that junction.

Thus, a feature of the invention is the use of a single field effect transistor both as an impedance translator and as a transmission gate, thereby minimizing circuit complexity and noise insertion into the system.

These and other objects and advantages of the invention will be more fully understood from the following detailed description of an illustrative embodiment thereof taken in conjunction with the appended drawings.

DETAILED DESCRIPTION OF THE DRAWINGS

Figure 1:
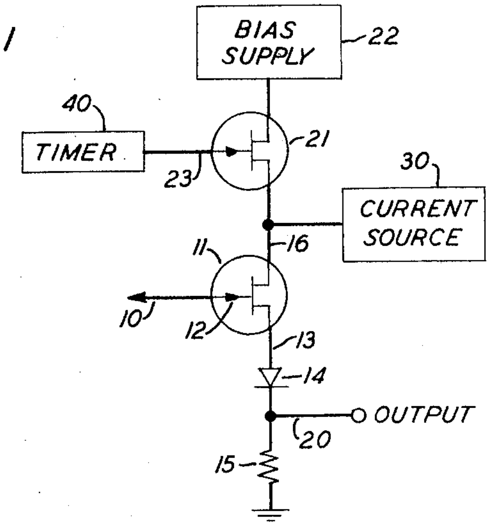
FIG. 1 is a schematic presentation of a bidirectional transmission system which illustrates the practice of this invention.

FIG. 1 illustrates one embodiment of a circuit in accordance with this invention which may be utilized in a low level amplification system for selectively transmitting signals from a source. In one mode of operation, signals from individual low level sources, for example, nerve cells or the like, are sensed by probe 10. Typically, probe 10 is a micro-electrode designed specifically for use in this type of application. Probes of this type are generally high impedance devices which detect signals at very low levels. Therefore, to minimize noise and circuit complexity, a low noise impedance transformation network is generally used before signals are amplified. Thus, an N-channel field effect transistor (FET) 11 is utilized, in accordance with the invention, in a source follower configuration to perform the impedance transformation. Such a device exhibits a high input impedance and is inherently low in self generated noise. Accordingly, probe 10 is connected to gate terminal 12 of FET 11. Source terminal 13 of transistor 11 is connected to the anode of diode 14. Diode 14 is connected in series with output impedance 15, and impedance 15 is returned to a reference point, ground in this case. Diode 14 is utilized primarily during the stimulation mode of operation and does not affect the operation of the source follower. Drain terminal 16 of FET 11 is connected through switching element 21 to bias supply 22. Element 21 may take any desired form; in this instance an N-channel FET is utilized to minimize the noise level in the system. Bias supply 22 is used to bias FET 11, in well-known fashion, for normal operation as a source follower.

Figure 2:
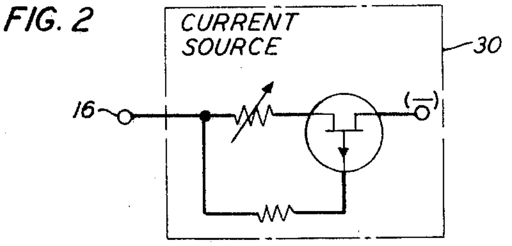
FIG. 2 shows in greater detail a current source which may be utilized in the apparatus of FIG. 1.

Adjustable current source 30 is connected to drain terminal 16 of FET 11. Source 30 may be of any desired type; preferably, it is one which may be adjusted for various current levels. A typical example of one such current source, incorporating a P-channel field effect transistor in a manner well known in the art, is shown in FIG. 2.

Figure 3:
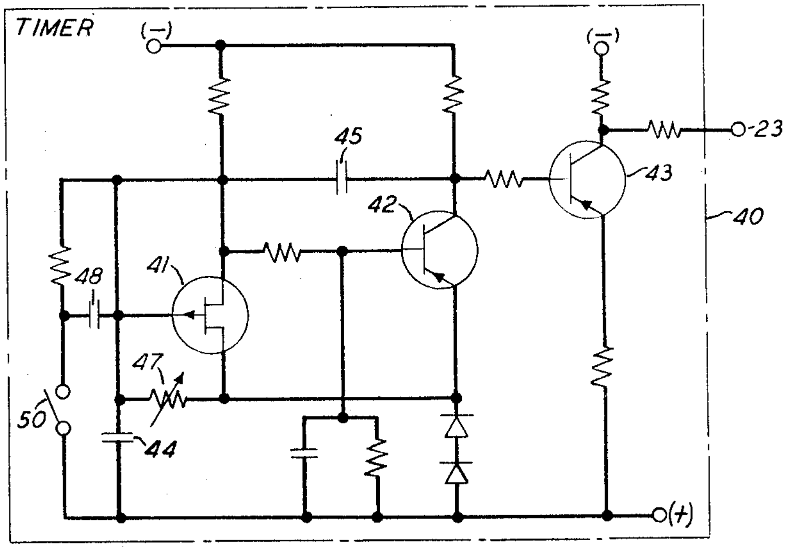
FIG. 3 shows details of a timer circuit which may be utilized in the apparatus of FIG. 1.

Current source 30 is utilized during the stimulation or marking mode of operation of the circuit. To initiate this mode of operation, timer 40 is utilized to control switching device 21. Timer 40 may be of any desired form and operates in conventional manner. Preferably, it is one with a large range of operating times, for example, one second to ten minutes. One such timer is shown in FIG. 3 and will be discussed later. Another timer, which may be utilized in practicing the invention, is described in "Field Effect Transistors," Leonce J. Sevin, Jr., McGraw-Hill Book Company, 1965, at page 88.

In practice, during amplification of low level electrical signals from nerve cells or the like, switching device 21 is actuated. Thus, FET 11 is biased by supply 22 in conventional manner to operate as a normal source follower. Signals sensed by probe 10 are applied to gate terminal 12 and appear at source terminal 13. They are delivered to output terminal 20 by way of diode 14 for further amplification or for use as desired.

In order to stimulate or mark the location of nerve cells, timer 40 is triggered in any desired fashion. A potential is then applied to gate terminal 23 of switching device 21, biasing it into cutoff, thereby separating bias supply 22 from drain terminal 16 of FET 11. A negative current, in this instance, from adjustable current source 30, forward biases the drain to gate junction of FET 11. The current is transmitted to probe 10, and used to stimulate a cell. Diode 14 prevents the current from source 30 from being shunted through impedance 15 to circuit ground. Thus, secondary source 30 is effectively isolated from the source follower output. The magnitude of the current applied to the cell will either stimulate it or cause a small lesion due to the power dissipated at the cell. For a lesion to occur, the magnitude of the current must necessarily be higher than that for stimulation of the cell. Timer 40 may also be actuated to permit current from source 30 to be delivered to any other signal utilization device in circuit relation with gate 12 of FET 11.

FIG. 3 is a detailed schematic of timer 40 which may be utilized in the practice of this invention. Timer 40 comprises a monostable multivibrator stage and an output stage. The monostable multivibrator stage comprises P-channel FET 41, PNP transistor 42, and the associated circuitry. The output stage comprises PNP transistor 43 and its associated circuit. Operation of the monostable multivibrator stage is conventional with FET 41 being utilized basically for its high input impedance characteristics, thereby allowing long periods of operation in the astable mode. The astable period is determined for the most part by capacitors 44 and 45 discharging through variable resistor 47.

In operation, FET 41 is normally ON, transistor 42 is normally OFF, transistor 43 ON, and the output at 23 is a positive potential. Thus, switching element 21 of FIG. 1 is normally ON. To initiate a timing cycle, switch 50 is momentarily closed. This causes FET 41 to be driven to cutoff due to application of a positive transient to the gate terminal of FET 41 through capacitor 48. Capacitors 44 and 45 discharge through resistance 47, which is adjusted for the desired period of the cycle. Transistor 42 is, accordingly, turned ON, thereby cutting off transistor 43. The output at point 23 then becomes of sufficient negative potential to cut off switching element 21 of FIG. 1. At the end of the predetermined period, set by capacitors 44 and 45 and resistor 47, the circuit returns to its initial state.

The above-described arrangements are, of course, merely illustrative of application of the principles of the invention. Numerous other arrangements may be devised by those skilled in the art without departing from the spirit and scope of the invention. For example, continuous operation having selected periods of the alternate modes of operation may be desired. This may be accomplished by replacing timer 40 (FIG. 1) with a pulse generator. The output of the generator should be adjusted to gate FET 21 ON and OFF is a manner corresponding to the desired receiving and transmission periods.

What is claimed is:

1. A bidirectional transmission circuit comprising:
a field effect transistor having drain, source, and gate terminals arranged in a source follower configuration for translating the impedance of a primary signal source;
a voltage supply for biasing said field effect transistor; and
means in circuit relationship to said field effect transistor for selectively transmitting signals from a secondary signal source through said field effect transistor to said primary signal source.

2. A circuit comprising:
a field effect transistor having drain, source, and gate terminals arranged in a source follower configuration,
a voltage supply for biasing said field effect transistor, and
means in circuit relationship with said field effect transistor for selectively propagating signals from at least one of said terminals through said field effect transistor to said gate terminal by forward biasing a junction of said field effect transistor.

3. A circuit as defined in claim 2 wherein said means for selectively propagating includes:
a switching device through which said bias voltage is supplied to said field effect transistor;
controllable means for selectively de-activating said switching device;
a current source connected to a terminal of said field effect transistor for supplying a current to the gate terminal of said field effect transistor when said switch is de-activated; and
a diode connected in the source circuit of said field effect transistor to prevent shunting of said secondary current.

4. A circuit as defined in claim 3 wherein said current source is connected to the drain terminal of said field effect transistor.

5. A circuit as defined in claim 3 wherein said switching device is a field effect transistor.

6. A circuit as defined in claim 3 wherein said controllable means is a timing circuit.

7. A circuit as defined in claim 3 wherein said controllable means is a pulse generator having a continuous pulsating output.

8. A bidirectional transmission circuit comprising:
a first field effect transistor having drain, source, and gate terminals arranged in a source follower configuration for translating the impedance of a primary signal source;
a bias voltage supply;
a second field effect transistor for selectively applying said bias voltage to the drain terminal of said first field effect transistor;

controllable means for selectively biasing said second field effect transistor into cutoff;

a secondary signal source connected to said first field effect transistor for supplying a signal to said primary source through said first field effect transistor when said second field effect transistor is cut off; and a diode connected to the source terminal of said first field effect transistor for preventing the shunting of said secondary signal away from said primary source.

9. The circuit as defined in claim 8 wherein said controllable means is a timing mechanism.

10. The circuit as defined in claim 8 wherein said secondary source is a constant current source, said current source being adjustable to different current levels.

References Cited

UNITED STATES PATENTS 3,436,672 4/1969 Delagrange ---------- 307—307

OTHER REFERENCES

"A Large Signal IGFET D.C. Source Follower" by D. P. Stokesberry, Proceedings of the IEEE 54, No. 1, 66, page 66.

JOHN S. HEYMAN, Primary Examiner

H. A. DIXON, Assistant Examiner

U.S. Cl. X.R.

307—304